(12) United States Patent
Achten et al.

(10) Patent No.: US 9,398,737 B2
(45) Date of Patent: Jul. 26, 2016

(54) SOIL CULTIVATION IMPLEMENT

(75) Inventors: Georg Achten, Tönisvorst (DE);
Johannes Terboven, Alpen (DE)

(73) Assignee: LEMKEN GmbH & Co. KG, Alpen (DE)

( * ) Notice: Subject to any disclaimer, the term of this patent is extended or adjusted under 35 U.S.C. 154(b) by 66 days.

(21) Appl. No.: 13/994,944

(22) PCT Filed: Dec. 16, 2011

(86) PCT No.: PCT/DE2011/002153
§ 371 (c)(1),
(2), (4) Date: Jun. 17, 2013

(87) PCT Pub. No.: WO2012/089193
PCT Pub. Date: Jul. 5, 2012

(65) Prior Publication Data
US 2013/0264081 A1 Oct. 10, 2013

(30) Foreign Application Priority Data
Dec. 17, 2010 (DE) .......................... 10 2010 054 945

(51) Int. Cl.
*A01B 5/04* (2006.01)
*A01B 21/08* (2006.01)
*A01B 5/08* (2006.01)

(52) U.S. Cl.
CPC ................. *A01B 5/04* (2013.01); *A01B 21/086* (2013.01); *A01B 5/08* (2013.01)

(58) Field of Classification Search
CPC ..................................... A01B 5/04; A01B 5/08
USPC ....................................................... 172/574
See application file for complete search history.

(56) References Cited

U.S. PATENT DOCUMENTS

| 876,145 | A | * | 1/1908 | Buchet et al. .................. 172/569 |
| 1,397,333 | A | * | 11/1921 | Schmitt .................. A01B 25/00 172/185 |
| 1,631,639 | A | * | 6/1927 | McDonald ....................... 37/366 |
| 1,740,874 | A | * | 12/1929 | Polhemus et al. ............. 172/582 |
| 1,888,128 | A | * | 11/1932 | Hester ............................ 172/574 |
| 1,944,275 | A | | 1/1934 | Sandeen |

(Continued)

FOREIGN PATENT DOCUMENTS

| EP | 1449419 A1 | 8/2004 |
| GB | 1450535 A | 9/1976 |

(Continued)

*Primary Examiner* — Thomas B Will
*Assistant Examiner* — Joel F. Mitchell
(74) *Attorney, Agent, or Firm* — James Creighton Wray; Meera P. Narasimhan

(57) ABSTRACT

The invention refers to a soil cultivation implement with two successively and obliquely positioned frame parts, on which hollow discs on separately rotating bearings are positioned in parallel. Hollow discs of one frame part point in the direction of working with the concave sides obliquely to the front and the outside. Hollow discs of the other frame part point in the direction of working with the concave sides obliquely to the front and the center. The chords of the concave sides of the hollow discs are positioned to form an obtuse angle with the surface of the soil. The respective two hollow discs in the middle section that point towards each other with their concave sides or their convex sides are constructed so that in each case one of these hollow discs has a smaller diameter and is positioned in the direction of working offset towards the adjacent hollow discs.

22 Claims, 4 Drawing Sheets

(56) References Cited

U.S. PATENT DOCUMENTS

| | | | |
|---|---|---|---|
| 4,403,662 A * | 9/1983 | Dietrich, Sr. | 172/156 |
| 4,446,924 A * | 5/1984 | Dietrich, Sr. | 172/140 |
| 4,542,793 A * | 9/1985 | Dietrich, Sr. | 172/180 |
| 7,048,069 B1 * | 5/2006 | Bollich | A01B 21/086 172/139 |
| 8,997,886 B2 * | 4/2015 | Stark | A01B 21/08 172/579 |

FOREIGN PATENT DOCUMENTS

| | | |
|---|---|---|
| WO | 0004755 A1 | 2/2000 |
| WO | 2008033091 A2 | 3/2008 |

* cited by examiner

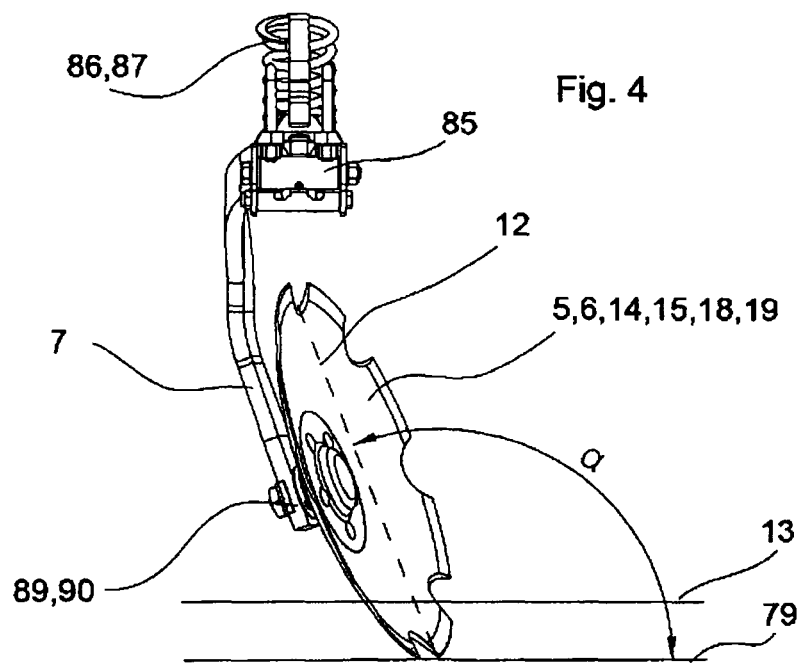
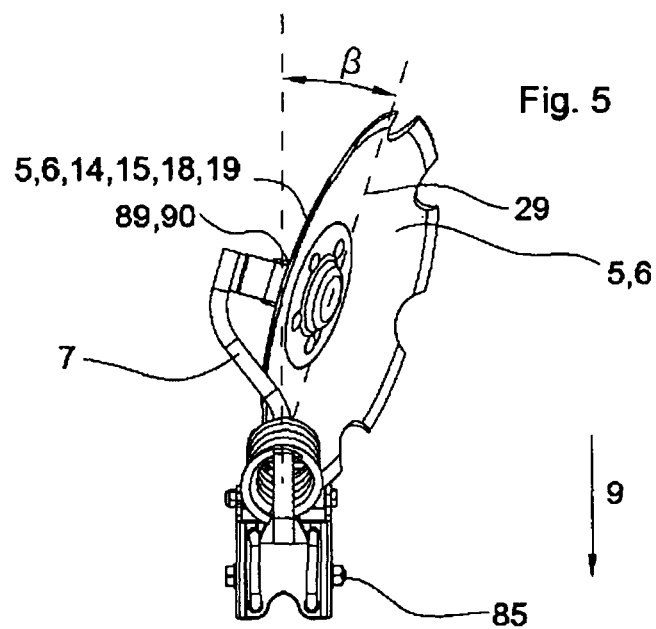

SOIL CULTIVATION IMPLEMENT

This application claims the benefit of German Application No. 10 2010 054 945.2 filed Dec. 17, 2010 and PCT/DE2011/002153 filed Dec. 16, 2011, International Publication No. WO 2012/089193, which are hereby incorporated by reference in their entirety as if fully set forth herein.

The invention refers to a soil cultivation implement with a frame with two successively and obliquely positioned frame parts, on which rotatable hollow discs are positioned in parallel and connected to the frame parts via bearer arms, whereby the hollow discs of the front frame part in the direction of working point with the concave sides in the direction of working obliquely to the front and the outside and the hollow discs of the rear frame part in the direction of working point with the concave sides in the direction of working obliquely to the front and the centre, whereby the chords of the concave sides of the hollow discs form an obtuse angle with the surface of the soil.

A soil cultivation implement of this type is familiar from US patent specification U.S. Pat. No. 1,944,275. The object of this application is a towed soil cultivation implement with a frame with two frame parts, on which hollow discs with separate bearings are positioned in parallel. The hollow discs of the front frame part are positioned with the concave sides pointing obliquely to the front and the outside and the hollow discs of the rear frame part are positioned pointing obliquely to the front and the centre. In this solution, the strips of ground between the two front hollow discs in the centre area of the soil cultivation implement are not tilled, which leaves behind an unevenly tilled field, which necessitates increased cultivating effort for the following operations, if a reduction in yield is not intended to be accepted.

European patent application EP 1 449 419 also concerns a soil cultivation implement with a frame with two frame parts on which hollow discs with separate bearings are positioned in parallel. The hollow discs of the front frame part are positioned with the concave sides pointing obliquely to the front and to the outside and the hollow discs of the rear frame part are positioned pointing obliquely to the front and to the centre. In FIG. 1 a solution can be seen in which the angles of the centre hollow discs were altered so that the soil is cultivated in the centre section of the soil cultivation implement as well. For this purpose, the obtuse angle of the chords of the concave side of the hollow discs to the surface of the ground was altered so that it is no longer obtuse but acute. The middle hollow discs therefore no longer grip and are no longer able to penetrate the soil. They create a lift that can only be overcome through the weight of the implement and the penetration properties of the other hollow discs. With harder ground, this lift of the centre hollow discs cannot be overcome sufficiently, even with a heavier weight. The consequence of this is that a usually possible intended working depth is no longer achieved. This considerably limits the use of the soil cultivation implement, in particular if the hollow discs are already slightly worn after longer use and this has reduced the diameter of all hollow discs. FIG. 4 of EP 1 449 419 shows a solution in which the angle of the front hollow discs positioned in the middle section was not altered. Rather, the untilled cultivating strip between these hollow discs in the front row is tilled by the hollow discs of the back row. Because of the clearance problems, one of the two rear hollow discs that are positioned with their concave sides pointing to each other was positioned in the direction of working offset to the front. While this embodiment ensures a relatively even cultivating of the soil, this is not nearly sufficient and is only possible in combination with very small and very steeply pitched hollow discs. Blockage problems in the front section of the implement, in particular with a great deal of vegetation and deep cultivating depths, cannot be effectively avoided in this way.

The familiar solutions have the disadvantage that the ground is not tilled evenly over the whole working width, that blockages arising from clearance problems cannot be prevented and that the soil flow is not managed optimally. The consequence of this is usually that the soil has to be tilled again subsequently in order to achieve an evenly cultivated field, or a sufficiently good seed bed.

The task of the invention is to create an appropriate soil cultivation implement that is suitable for high cultivating speeds, in which the tools are distributed evenly over the working width and cultivate the soil evenly, that is structured simply and compactly and also works without blockages.

In accordance with the invention the task is solved in accordance with the elements of claim 1, whereby advantageously supplementing and alternative solutions are claimed in the further patent claims.

The use of a smaller hollow disc in the middle section of the front frame part means that larger means that with this one exception larger hollow discs with stable bearings can also be positioned with a small lateral clearance between them maintaining the given optimum obtuse angle to the surface of the soil, without having to accept losses of effectiveness and without the danger that blockages may occur. In an age in which intensity and area output are absolutely essential, agricultural and plant concerns have to be taken into account as well. This can be realised in a special way with the solution in accordance with the invention. The invention provides further that one of the two hollow discs is positioned offset to the other hollow disc and the offset between these hollow discs is calculated so that the one hollow disc is preferably with its rear edge practically in a line with the rear edge of the other hollow disc or the rear edges of the remaining hollow discs of the front frame part. Because practically all rear edges of all hollow discs of the front frame part are in a line, the clearance to the hollow discs that are behind on the rear frame part remains the same.

The invention provides in addition that the chord of the concave side of the hollow disc with the smaller diameter forms an obtuse angle $\alpha$ with the surface of the soil that is smaller than the angle $\alpha$ of the other hollow discs of the front frame part. A different angle creates slightly more clearance, which enables the use of larger bearings as well, with the danger that components can collide.

To prevent blockages it is noticed that the two hollow discs that are positioned in the middle section of the rear frame part point towards each other with their concave sides and that one of the two hollow discs has a diameter that is at least 20% smaller than the other hollow disc, and is offset in the direction of working towards the other hollow disc, preferably to the front. The provision of a clearly smaller hollow disc creates sufficient clearance that ensures that blockages cannot occur between the two hollow discs that point towards each other with their concave sides. Depending on the size of the hollow discs, the diameter of the smaller hollow disc can also be chosen slightly larger, e.g. only 15% smaller than the diameter of the other hollow disc.

The offset of the hollow disc is dimensioned so that the hollow disc with the smaller diameter seen from above is practically in a line with its front edge with the front edges of the other hollow discs. In this way an equal clearance is achieved between the hollow discs of the front frame part and the hollow discs of the rear frame part. The clearance that is necessary for blockage-free working is achieved in each case through the use of a smaller hollow disc on the respective frame part.

The invention provides further that for wide working or folding soil cultivation implements both the front frame part and the rear frame part are multi-part. Implements that are used with a small working width require only a single front and a single rear frame part respectively. For implements with a greater working width the invention provides that both front frame part and the rear frame part are multi-part, in order to guarantee a good adjustment of the individual hollow discs to the ground. This applies analogously as well to foldable soil cultivation implements. The invention does not rule out soil cultivation implements with a small working width having multi-part frame parts as well where required.

One proposal for the distribution of the hollow discs over the complete soil cultivation implement provides that the number of hollow discs planned for the soil cultivation implement is an even number greater than twenty and is not divisible by four. Basically, an arrangement of this type corresponds to an implement with an even number of hollow discs in the front row and a number increased by two in the rear row. This leads advantageously to a displacement of the centre of symmetry of the hollow discs, e.g. by a half disc clearance. In this way, an absolutely symmetrically loaded implement with balance force distribution is created, in which lateral pull or oblique raking cannot occur, if the same number of hollow discs is positioned on the left and the right of the middle of the implement both on the front frame part and on the rear frame part and, e.g., convey earth in the front from the middle to the outside, or in the rear convey earth from the outside in the direction of the middle of the implement.

In supplement to the previous measures it is provided that holding-down devices, which are positioned behind the hollow discs, are assigned to the hollow discs of the front frame part or of the front frame parts and/or of the rear frame part or the rear frame parts. These holding-down devices are designed so that they guide the soil peeled off by the hollow discs in such a way that the following hollow discs, which are positioned on the rear frame part, are not obstructed. The soil that is peeled off by the hollow discs of the front frame part and discharged to the side is collected by the holding-down devices and deposited. The allocation of holding-down devices behind the hollow discs of the rear frame part prevents following tools, e.g. a roller, from being obstructed by the peeled and thrown up soil. At high working speeds in particular, it is not possible to guide peeled soil in such a way that following tools are not obstructed. Through the holding-down devices the peeled soil is virtually settled and deposited so that following tools can carry out their function as planned without obstruction. In the variant of the invention in which holding-down devices, which are positioned behind the hollow discs, are assigned to the hollow discs of the front frame part or of the front frame parts and/or of the rear frame part or the rear frame parts, it is always ensured that the tools that are positioned in each case behind a holding-down device are not obstructed by the earth flow created by the hollow discs and therefore achieve the intended soil cultivation effect.

It is provided further that the holding-down devices are constructed as single-piece or multipart screening elements that take up the soil peeled off by the hollow discs and replace it on the soil surface, whereby the screening elements are constructed preferably from metal or plastic and, e.g. are constructed flexibly because of the selection of their cross-section. Because the holding-down devices or screen elements are constructed flexibly, soil cannot adhere even in clammy soil conditions. Because of the give or the movement of these components soil that is taken up falls off immediately and is deposited.

The invention provides in addition that guide parts, tines, or for example, harrow tines, are planned as holding-down devices or as screening elements and divert the soil that is peeled and pushed to the side by the hollow discs at least to an extent in the opposite direction. For example, the soil of the first hollow discs row is conveyed to the outside and the soil that is cultivated by the rear hollow discs row is conveyed to the middle. This means that grooves or furrows can remain in the edge area of the work area of the soil cultivation implement. The soil that is collected by the holding-down devices or the guide parts is in this way led back to the side in such a way that the grooves and furrows generated in the outer area by the outermost hollow discs are refilled with soil and smoothed.

Further details of the invention can be seen in the figures and in the description of the figures. These are as follows:

BRIEF DESCRIPTION OF THE DRAWINGS

FIG. 4 shows a front view of hollow disc unit and
FIG. 5 a top view of the hollow disc unit.

DETAILED DESCRIPTION

Figure 1:
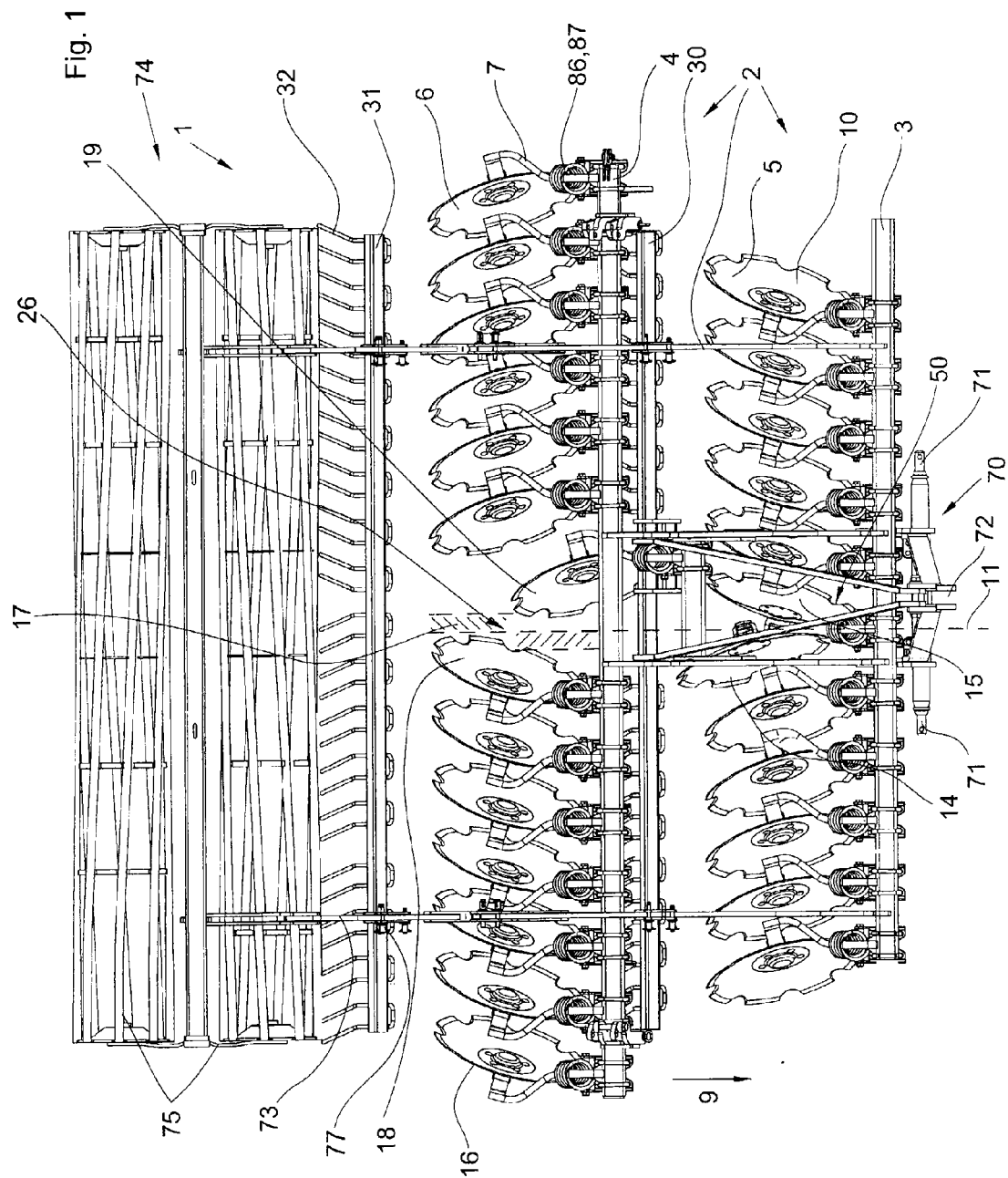
FIG. 1 shows a top view of the soil cultivation implement.

FIG. 1 shows a top view of the soil cultivation implement 1. The soil cultivation implement 1 can be a trailed, a hitched or an attached soil cultivation implement 1. FIG. 1 represents the embodiment of an attached soil cultivation implement 1. The three-point linkage 70 serves for the attachment to the three-point linkage of a tractor that is not shown. For this purpose the three-point linkage 70 has lower link points 71 and the upper link attachment point 72. The three-point linkage 70 is connected with frame 2, which consists among other things of a front frame part 3 and a rear frame part 4. Hollow discs 5 are positioned on front frame part 3 and hollow discs 6 on the rear frame part 4. Seen from the centre 11, the concave sides 10 of the hollow discs 5 point obliquely to the front and outwards seen from the direction of working 9. In the middle 11 or in middle section 50 hollow discs 5, namely hollow discs 14 and 15, are positioned so that they point towards each other with their convex sides 16. The individual hollow discs 5, 14 and 15 are positioned in such a way that their chords 12 of the respective concave side 10 form an obtuse angle α to the surface of the soil 13. This can be seen in particular in FIG. 4 as well. Hollow discs 14 and 15 are located in the middle section 50. Hollow disc 14 has a smaller diameter. It is offset towards hollow disc 15 in order to increase the clearance in front section 50 for the purposes of clearance. The offset is selected in such a way that components of the hollow discs 14 and 15, namely the support arms 7, the axles 89 of hollow discs 14 and 15 and the bearings 90 cannot collide, even if, in case of overload, one of the two hollow discs 14 and 15 swerves to the rear and upwards. A spring 86, which is a component of an overload protection 87, holds the respective hollow disc 5, 14 and 15 in the working position. Rear frame part 4, which holds hollow discs 6, is fastened to frame 2 as well. The hollow discs 6 are positioned here in such a way that they point with their concave sides 10 in the direction of working 9 obliquely to the front and to the middle 11. The chords 12 of the concave sides 10 of hollow discs 6 form an obtuse angle α with the surface of the soil 13. Hollow discs 18 and 19, which point towards each other with the concave sides, are located in the middle 11 of the rear frame part 4. In order to prevent blockages and to optimise the earth flow in the middle section between these discs 18 and 19, disc 19 has a smaller diameter and is located in a position offset to the front.

In the embodiment represented the rear edge 51 of hollow disc 14 with the smaller diameter is in a line 49 with the read edges 52 of the remaining hollow discs 5, 15 of the front frame part 3. The front edge 62 of hollow disc 19 is located on a line 60 with the front edges 61 of hollow disc 18 and the remaining hollow discs 6 of rear frame part 4. An untilled strip 17 remains between the two hollow discs 14 and 15, which are positioned on the front frame part 3. This strip 17, which is offset from the middle, is cultivated by the two hollow discs 18 and 19. At high working speeds in particular hollow discs 5 and 6 throw the soil up in such a way so that following soil cultivation implements can be obstructed in their function. In order to prevent this, holding-down devices 30 are located behind hollow discs 5 and holding-down devices 31 behind hollow discs 6. Holding-down devices 30 or 31 consist hereof harrow tines 32, which are positioned in such a way that they return the soil that is moved to the side by hollow discs 5 and 6 as far as possible in the opposite direction. Frame 2 supports not only front frame part 3 and rear frame part 4, but also the beams 73 to which the roller 74 is fastened. The roller 74 consists in this case of two roller bodies 75. Depending on the soil type and the required working effect, rollers can also be used here that achieve a greater packing effect, cutting effect or crumble effect as well.

Figure 2:
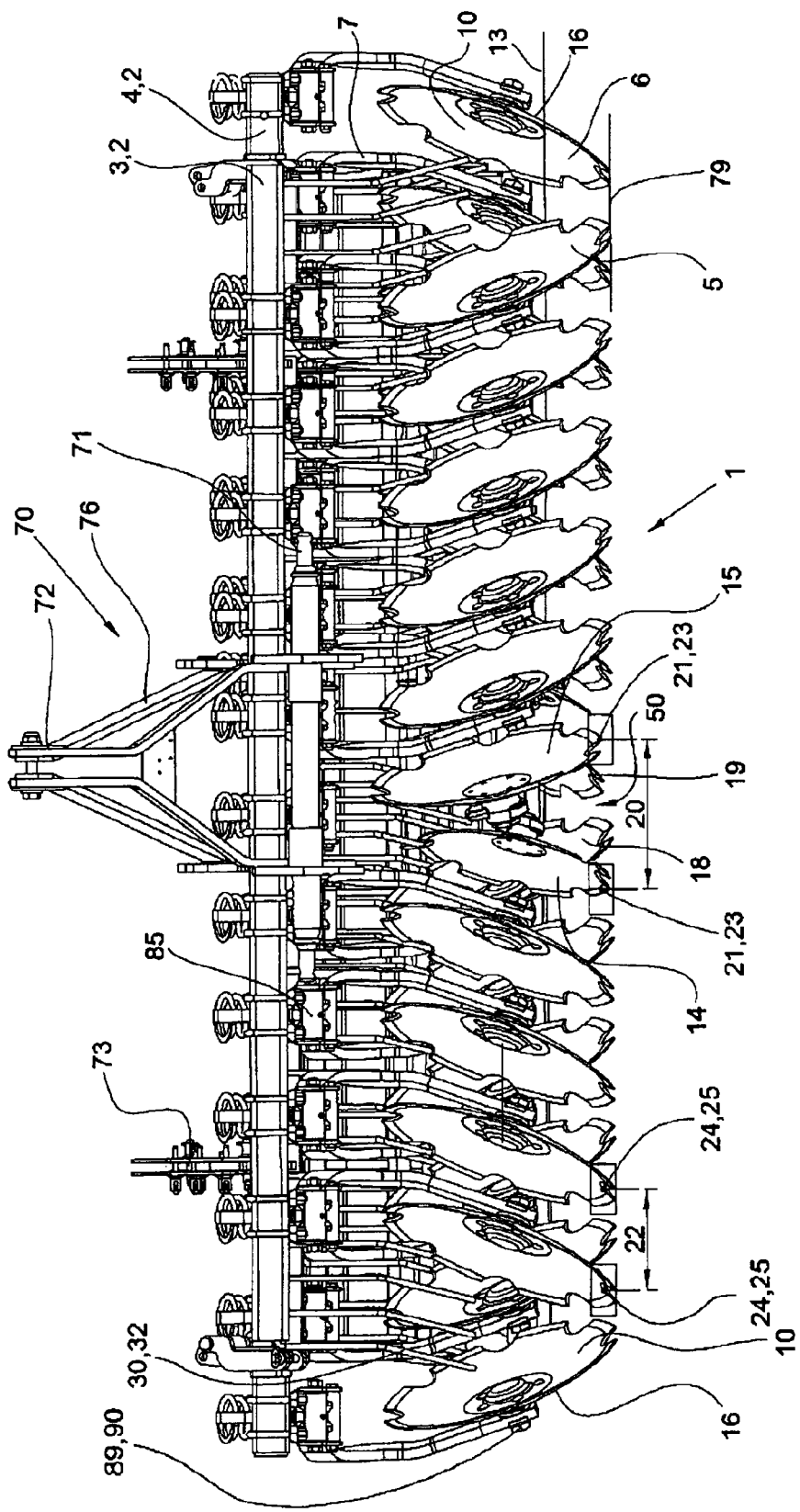
FIG. 2 shows a front view of the soil cultivation implement.

FIG. 2 shows a front view of the soil cultivation implement 1. It makes clear in particular that hollow discs 5, 6, 14, 15, 18 and 19 are positioned so that the soil is evenly cultivated over the whole working width of soil cultivation implement 1. Each of the previously designated hollow discs works a cultivation cross-section 23 or 25. Cultivation cross-sections 23 are those that are cultivated by hollow discs 14 and 15, which are located in the middle section 50 of the soil cultivation implement 1. The cultivation cross-sections that are tilled by hollow disc 5, which are not located in the middle section 50 of the soil cultivation implement 1, are designated 25. A centre 21 or 24 is allocated to the respective cultivation cross-section 23, 25. Here the clearance 20 between the centres 21 of the cultivation cross-sections 23 of hollow discs 14 and 15 is about 1.5 times larger than the clearance 22 of centres 24 of cultivation cross-sections 25. This division of the hollow discs 5, 14 and 15 has the effect that a cultivation strip 17 remains in the middle section 50 that is cultivated by the rear hollow discs 18 and 19. All hollow discs 5 and 6, 14 and 15 and 18 and 19 are positioned so that each hollow disc works a cultivation cross-section 23, 25 of roughly the same size, which has the effect that an even soil cultivating effect is achieved over the whole working width. In FIG. 2 the surface of the soil 13 and the working horizon 79 of the hollow discs are indicated. The difference between the height position of surface of the soil 13 and of the working horizon 79 corresponds to the working depth of hollow discs 5 and 6.

Figure 3:
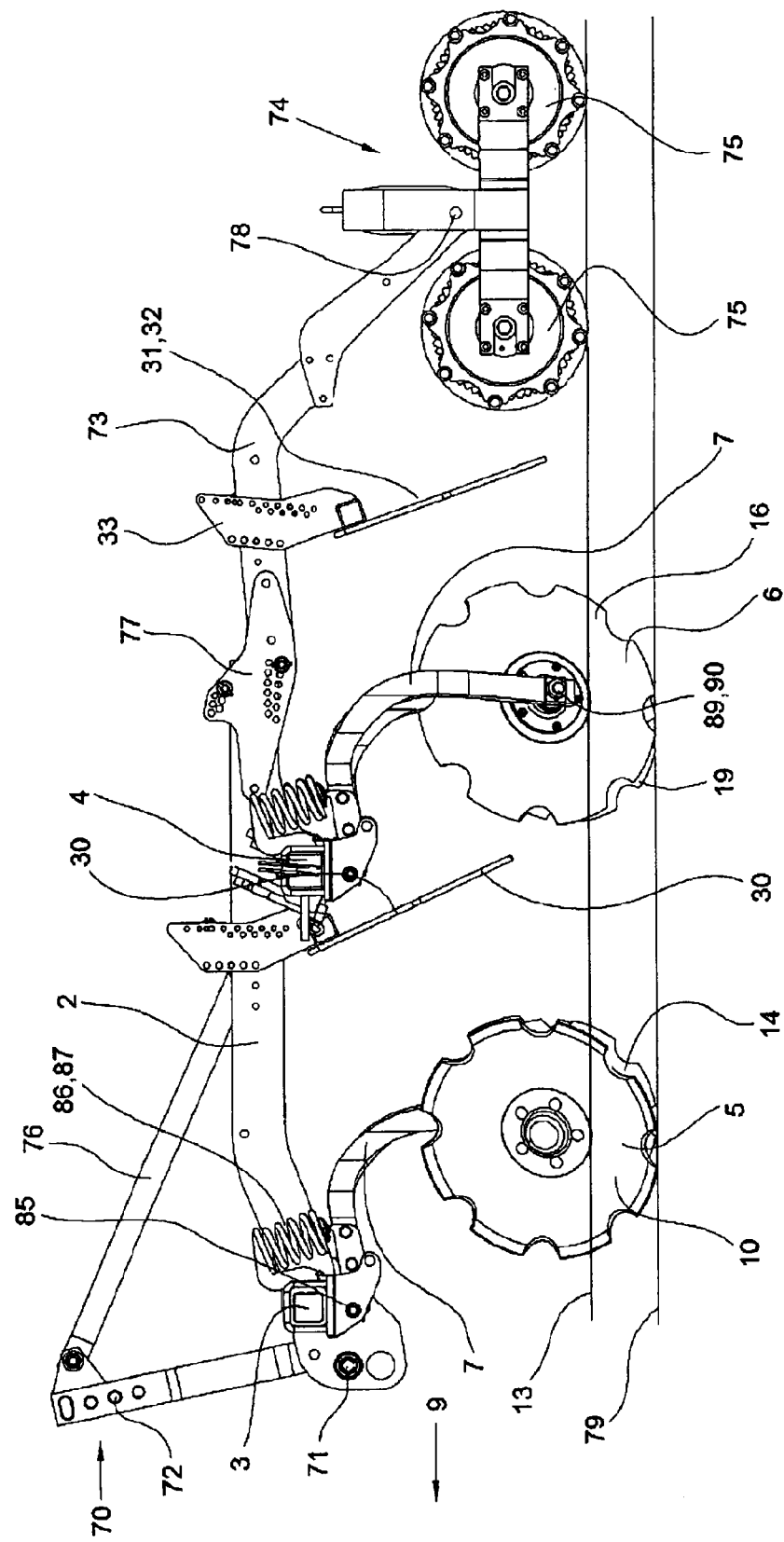
FIG. 3 shows a side view of the soil cultivation implement.

FIG. 3 shows a side view of the soil cultivation implement 1. It makes clear that the three-point linkage 70 is connected to frame 2 through the support 76. FIG. 3 also shows the fastening of the hollow discs 5 and 6 with the frame parts 3 and 4 through axles 98, bearings 90, support arms 7, swiveling axle 85, overload protection 87 with spring 86. The holding-down devices 30 and 31 with the harrow tines 32 are positioned so that they take up the soil that is thrown up by hollow discs 5 and 6 and deposit it on the ground. The holding-down devices 30 ensure that the hollow discs 6 are not obstructed by the soil thrown up by hollow discs 5. The holding-down devices 31 ensure that the soil thrown up by hollow discs 6 does not obstruct the run of roller 74. Adapted to the respective function, holding-down devices 30 and 31 are positioned more or less closely to the surface of the soil 13. The working depth of the soil cultivation implement 1 is set using the depth setting device 77. Holding-down devices 31 or 32 each has an adjusting device 33 with which they can be set with regard to angle and depth as well.

FIG. 4 contains a front view of a disc unit with hollow discs 5, 6, 14, 15, 18 or 19. It makes clear how the chord 12 of the concave side 10 of the respective hollow disc forms an obtuse angle α to the surface of the soil 13 or to the working horizon 79 of the hollow discs. The respective hollow disc has an axle 89 and bearing 90 with which it is connected to the support arm 7. The support arm 7 is connected via the swiveling axle 85 with the respective frame part 3 or 4 and is held in the working position with spring 86 via the overload protection 87. The solution in accordance with the invention is conceivable, e.g. with hollow discs on separate bearings or two hollow discs of the same size on a support arm 7. In addition, hollow discs on joint bearings on a support arm 7 with axles displaced towards each other and/or hollow discs with different diameters can be used.

FIG. 5 shows a top view of the hollow disc unit that makes clear the oblique position of the respective hollow disc in the direction of working 9. The hollow discs 14 and 15, which are located in the middle section 50 on the front frame part 3, have preferably a slightly smaller angle α and where applicable a smaller angle β as well. This then ensures that the earth flow that is produced by hollow disc 14 is guided to the rear flatter. Because of the offset of hollow disc 14 to the rear, a holding-down device 30 there has to be constructed slightly differently. In order to achieve in sum an even soil cultivating effect the angle α and possibly angle β as well of the hollow disc have to be altered slightly. A hollow disc 14 with slightly less convexity can achieve a similar effect.

The invention claimed is:

1. Soil cultivation implement (1) comprising a frame (2) with two frame parts including a front frame part and a rear frame part (3, 4) positioned in tandem, rotating hollow discs (5, 6) having concave sides are positioned in parallel and are connected to the front and the rear frame parts (3, 4) through support arms (7), the hollow discs (5) of the front frame part (3) seen in a direction of working (9) point obliquely to a front and to an outside having concave sides (10) in the direction of working (9) and the hollow discs (6) having concave sides of the rear frame part (4) seen in the direction of working (9) point obliquely to the front and to a centre (11) in the direction of working, chords (12) of the concave sides (10) of the hollow discs (5, 6) form an obtuse angle (a) with a soil surface (13), two front hollow discs (14, 15) of the hollow discs on the front frame part (3) located in a front middle section (50) of the front frame part (3) point towards each other with their convex sides (16) and one of the two front hollow discs (14, 15) has a diameter that is at least 20% smaller than that of adjacent hollow discs (5) and the front hollow discs (14, 15) left or right of a cultivation strip (17) are positioned to in front of at least one of two following rear hollow discs (18, 19) of the rear frame part (4) that point towards each other with their concave sides, whereby one of the two front hollow discs (14, 15) is positioned offset towards another of the two front hollow discs (14, 15) relative to other discs of the hollow discs on the front frame, and the offset between the two front hollow discs is dimensioned so that a one of the two front hollow discs (14) has a rear edge (51) substantially in line (49)

with a rear edge (52) of another of the two front hollow discs (15) or in line with rear edges of the hollow discs (5) on the front frame part (3).

2. Soil cultivation implement in accordance with claim 1, wherein two rear hollow discs (18, 19) of the hollow discs positioned in a rear middle section (26) of the rear frame part (4) point towards each other with their concave sides (10) and one of the two rear hollow discs (18, 19) has a diameter that is at least 20% smaller than a diameter of another of the two rear hollow discs and is offset relative to each other and in the direction of working (9) towards the other of the two rear hollow discs to the front.

3. Soil cultivation implement in accordance with claim 2, wherein the offset of said one of the two rear hollow discs is dimensioned so that said one of the two rear hollow discs (19) with the smaller diameter seen from above is substantially in line (60) with its front edge (62) with the front edges (61) of the other hollow discs (18, 6) of the rear frame part.

4. Soil cultivation implement in accordance with claim 1, wherein the chord (12) of the concave side (10) of the hollow disc with the smaller diameter (14) forms an obtuse angle (a) with the surface of the soil (13) that is smaller than an angle (a) of the other hollow discs (5) of the front frame part (3).

5. Soil cultivation implement in accordance with claim 1, wherein for wide working or foldable soil cultivation implements (1) both the front frame part (3) and the rear frame part (4) are constructed in several parts.

6. Soil cultivation implement in accordance with claim 1, wherein a number of hollow discs (5, 6, 14, 15, 18, 19) planned for the soil cultivation implement (1) is an even number greater than twenty and is not divisible by four.

7. Soil cultivation implement in accordance with claim 1, wherein the hollow discs (5) of the front frame part (3) or of the rear frame part (4) are assigned holding-down devices (30, 31) that are positioned behind hollow discs (5, 6).

8. Soil cultivation implement in accordance with claim 7, wherein the holding-down devices (30, 31) are constructed as single part or multipart screening elements, which take up soil peeled by the hollow discs (5, 6, 14, 15, 18, 19) and deposit it back on the surface of the soil (13), whereby the screening elements are formed flexibly.

9. Soil cultivation implement in accordance with claim 7, wherein the holding-down devices are selected from the group consisting of guide parts, baffles, hoods, tines, and harrow tines.

10. A soil cultivation device comprising a main frame and at least two frame parts connected to the main frame, the at least two frame parts forming a front frame part with a first middle section and a rear frame part with a second middle section positioned in tandem, a first set of rotatable hollow discs on the front frame part and a second set of rotatable hollows discs on the rear frame part, the first set of rotatable hollow discs and the second set of rotatable hollow discs disposed parallel to one another, first support arms connecting the front frame part to the main frame, second support arms connecting the rear frame part to the main frame, the first set of rotatable hollow discs comprising first front discs having first concave sides and first convex sides and the second front discs having second concave sides and second convex sides, the first front discs disposed obliquely on the front frame part with the first concave sides facing away from the first middle section of the front frame part towards one outer side of a working direction, the second front discs disposed obliquely on the front frame part with the second concave sides facing away from the first middle section of the front frame part towards another outer side of the working direction opposite the one outer side, the second set of rotatable hollow discs comprising first rear discs having third concave sides and third convex sides and second rear discs having fourth concave sides and fourth convex sides, the first rear discs disposed obliquely on the rear frame part with the third concave sides facing towards the second middle section of the rear frame part away from the one outer side of the working direction, the second rear discs disposed obliquely on the rear frame part with the fourth concave sides facing towards the second middle section of the rear frame part away from the other outer side of the working direction opposite the one outer side, first chords on the first and second concave sides forming a first obtuse angle with a soil surface, a first adjacent pair of hollow discs of the first set of rotatable hollow discs in the first middle section of the front frame part having respective convex sides facing each other, the one of the first adjacent pair of hollow discs having a diameter at least 20% smaller than a diameter of another of the first adjacent pair of hollow discs, the one of the first adjacent pair of hollow discs disposed at a first offset towards the other of the adjacent pair of hollow discs relative to other discs of the first set of rotatable hollow discs on the front frame part, one of the first adjacent pair of hollow discs comprising a first rear edge and the other of the first adjacent pair of hollow discs comprising a second rear edge, and the first offset having a dimension such that the first rear edge and the second rear edge are substantially aligned with each other.

11. The device of claim 10, wherein the first set of hollow discs have respective rear edges and the first rear edge is aligned substantially with the respective rear edges of remaining set of hollow discs of the first set of hollow discs on the front frame part.

12. The device of claim 10, further comprising a second adjacent pair of hollow discs of the second set of rotatable hollow discs in the second middle section of the rear frame part having respective concave sides facing each other, and wherein one of the second adjacent pair of hollow discs has a diameter at least 20% smaller than a diameter of another of the second adjacent pair of hollow discs.

13. The device of claim 12, wherein the offset of the one of the second adjacent pair of hollow discs has a dimension smaller than a dimension of the other of the second adjacent pair of hollow discs, the one of the second adjacent pair of hollow discs is disposed at a second offset towards the other of the second adjacent pair of hollow discs, wherein the one of the second adjacent pair of hollow discs comprises a first front edge and the other of the second adjacent pair of hollow discs comprises a second front edge, and the second offset has a dimension such that the first rear edge and the second rear edge are substantially aligned with each other.

14. The device of claim 13, wherein the second set of hollow discs have respective front edges and the first front edge is aligned substantially with the respective front edges of remaining hollow discs of the second set of hollow discs on the rear frame part.

15. The device of claim 13, further comprising second chords on the third and fourth concave sides, wherein the chord of the one of the second adjacent pair of hollow discs having a smaller dimension forms an obtuse angle with the soil surface, and wherein the second obtuse angle is smaller than the first obtuse angle.

16. The device of claim 10, wherein the front frame part and the rear frame part comprise plural parts forming wide working or foldable soil cultivation implement.

17. The device of claim 16, wherein plural hollow discs of the first set of hollow discs and the second set of hollow discs for the soil cultivation implement are an even number greater than twenty and not divisible by four.

18. The device of claim 17, further comprising first holding devices on the front frame part for the first set of hollow discs disposed behind the first set of hollow discs and second holding devices for the second set of hollow discs on the rear frame part disposed behind the second set of hollow discs.

19. The device of claim 18, wherein the first and the second holding devices are a single part or multipart screening elements, and wherein soil peeled by the first set and the second set of hollow discs is displaced and deposited back on the soil surface.

20. The device of claim 19, wherein the screening elements are flexible.

21. The device of claim 19, wherein the holding devices are selected from the group consisting of guide parts, baffles, hoods, tines, harrow tines, and combinations thereof.

22. The device of claim 19, wherein the first and the second holding devices divert at least part of the soil peeled and displaced by the first set and the second set of hollow discs in a direction opposite to a direction of displacement by the first set and the second set of hollow discs.

* * * * *